United States Patent [19]
Lester et al.

[11] Patent Number: 5,593,135
[45] Date of Patent: Jan. 14, 1997

[54] PRECISE THROTTLING BALL VALVE

[75] Inventors: Leo M. Lester, Medford, Mass.; Yasunori Kuroki, Nobeoka, Japan

[73] Assignee: Asahi/America, Inc., Malden, Mass.

[21] Appl. No.: 440,240

[22] Filed: May 12, 1995

[51] Int. Cl.[6] ........................................ F16K 5/10
[52] U.S. Cl. ........................... 251/209; 251/315.16
[58] Field of Search ............................ 251/208, 209, 251/205, 315.01, 315.16

[56] References Cited

U.S. PATENT DOCUMENTS

| | | | |
|---|---|---|---|
| 2,115,675 | 4/1938 | Tremmel | 251/209 |
| 3,542,337 | 11/1970 | Scaramucci | 251/209 |
| 4,989,833 | 2/1991 | Polón | 251/208 X |

*Primary Examiner*—Kevin Lee
*Attorney, Agent, or Firm*—Anthony J. Casella; Gerald E. Hespos

[57] ABSTRACT

A ball valve is provided for precise throttling of fluid through the valve. The valve includes a valve housing having a fluid passageway and a valve seat intermediate the fluid passageway. A valve stem extends through the valve housing into the valve seat and is rigidly connected to a spherical valving member rotatably mounted in the valve seat. The valving member includes a passageway extending therethrough. The passageway is cylindrical from the upstream end substantially to the downstream end. However, the downstream end is partly closed by a spherically generated throttling wall. A generally oblong outlet extends through the throttling wall. The long axis of the oblong outlet is generally orthogonally aligned to the axis of the passageway and to the rotational axis of the valve stem.

9 Claims, 2 Drawing Sheets

PRECISE THROTTLING BALL VALVE

BACKGROUND OF THE INVENTION

1. Field of the Invention

The subject invention relates to ball valves that permit flow rates to be predictably varied between the fully opened and the fully closed positions of the valve.

2. Description of the Prior Art

Prior art ball valves include a valve housing having an upstream end, a downstream end and a valve seat therebetween. An upstream fluid passage extends from the upstream end to the valve seat, and a downstream fluid passage extends from the valve seat to the downstream end. The upstream and downstream fluid passages are cylindrical and are axially aligned with one another. The prior art ball valve further includes structure for connecting the respective upstream and downstream ends of the valve housing to upstream and downstream pipes. For example, the exterior of the valve housing may include arrays of external threads at the respective upstream and downstream ends. Coupling nuts may be threaded with the respective arrays of external threads on the valve housing. The coupling nuts may be used to secure pipes or nipples to the respective upstream and downstream ends of the valve housing.

The prior art ball valve housing further includes a stem aperture aligned orthogonally to the fluid passageway and extending from an external region on the valve housing into the valve seat. A valve stem is rotatably mounted in the stem aperture. A spherical valving member, or ball, is rigidly mounted to the valve stem and is rotatably disposed in the valve seat. The typical prior art spherical valving member for a ball valve includes a cylindrical fluid passageway extending entirely therethrough. The cylindrical passageway has a diameter substantially equal to the inside diameter of the pipes with which the prior art ball valve is connected. Rotational forces on portions of the valve stem external of the housing are transmitted to the spherical valving member within the housing. The typical prior art ball valve include stops which enable the valve stem and the spherical valving member to rotate only 90°. At one end of the 90° range of movement, the cylindrical passageway through the spherical valve stem is aligned axially with the upstream and downstream passages through the valve housing to permit a full substantially unimpeded flow of fluid through the valve. At the other extreme of the 90° range of motion, the cylindrical passageway through the spherical valving member is aligned orthogonally to the upstream and downstream passages through the valve housing such that fluid flow through the valve is completely blocked.

The rate of fluid flow through the prior art ball valve can be varied by rotating the valve stem and the spherical valving member to positions between the fully opened position and the fully closed position. However, the fluid flow through the prior art ball valve does not vary linearly with respect to the amount of rotation of the valve. In particular, the typical prior art ball valve will achieve only small amounts of fluid flow during the initial rotation of the valve stem from the fully closed position. Fluid flow will then increase very significantly for subsequent incremental small rotational movements. Thus, a graph having valve rotation on the horizontal axis and fluid flow rates on the vertical axis would be substantially parabolically generated. This characteristic of prior art ball valves is not a problem for the vast majority of situations where the valve is merely rotated between the fully opened position and the fully closed position. However, some applications require the fluid flow rate to be throttled periodically to some measured flow rate less than the fully opened flow rate. The non-linear relationship between valve rotation and flow rate makes such throttling difficult. Thus, for example, a 45° rotation of the valve stem provides 50% of the range of movement of the valve stem, but is likely to provide a flow rate significantly different from 50%.

The prior art has included several attempts to provide a throttling ball valve. Typically these prior art throttling ball valves having included a gradually tapering fluid passageway through the spherical ball valve. The tapering passageway is disposed such that the cross-section at the upstream end of the passageway through the spherical valving member is larger than the cross-section at the downstream end of the passageway. In most such prior art attempts, the passageway is conically generated and is symmetrical about a diameter. An example of such a prior art throttling valve is shown in U.S. Pat. No. 3,542,337 to Scaramucci.

Some prior art throttling valves having included a non-symmetrical fluid passageway through the cylindrical valving member. On these valves, the upstream entrance to the tapering passageway is concentrically disposed relative to the axis of the passageway through the valve housing. The smaller downstream end of the passageway is at an off-center position relative to the passageway through the valve housing. Such a prior art valve is shown in U.S. Pat. No. 3,762,682 to Franck.

The fluid passageway through the spherical valving member of some prior art throttling ball valves have different shapes at the respective upstream and downstream ends, and the walls defining the fluid passageway taper continuously from the shape at the upstream end to the shape at the downstream end. For example, U.S. Pat. No. 3,542,338 to Scaramucci shows a throttling ball valve having a passageway with a circular cross-section at the upstream end of the spherical valving member. The walls of the fluid passageway through this prior art valve member gradually and continuously taper to define a rectangular or triangular cross-section at the downstream end of the fluid passageway through the spherical valving member.

While these prior art throttling ball valves provide a more direct relationship between valve rotation and fluid flow, there is a desire to provide improvements that achieve even more of a linear relationship between valve rotation and fluid flow. This need for a more linear relationship has been found to be particularly desirable in piping systems that tap methane gas from decaying material in buried landfill sites. In these environments, technicians monitoring the extraction of methane gas must frequently manually rotate the valve stems to achieve a selected proportion of the maximum flow rate. The non-linear relationship achieved with the prior art throttling ball valves has proved problematic.

Accordingly, it is an object of the subject invention to provide a ball valve capable of achieving a nearly linear relationship between valve rotation and fluid flow through the ball valve.

It is another object of the subject invention to provide a throttling ball valve that enables great throttling precision for use in gas flow systems, such as systems that tap methane gas from landfill sites.

SUMMARY OF THE INVENTION

The subject invention is directed to a ball valve having a housing with opposed upstream and downstream ends and a valve seat therebetween. A cylindrical upstream passage extends from the upstream passage extends from the upstream end to the valve seat and a cylindrical downstream passage extends from the valve seat to the downstream end. The upstream and downstream passages are of substantially identical diameters and lie along a common axis. Portions of the valve housing near the upstream and downstream ends may further include means for connecting the valve housing to pipes, nipples, fittings or other such elements of a piping system.

A stem aperture extends through the valve housing and is orthogonally aligned to the axis of the fluid passageway. A valve stem is rotatably mounted in the stem aperture and extends from a location external of the valve housing toward the valve seat.

A spherical valving member is rotatably mounted in the valve seat and is rigidly connected to the end of the valve stem disposed within the valve seat. Thus, rotation of the portion of the valve stem external of the valve housing generates corresponding rotation of the spherical valving member mounted in the valve seat. The valve housing and the valve stem may include inter-engaging means for limiting the rotation of the valve stem and the spherical valving member to 90°.

The spherical valving member includes a fluid passageway extending therethrough. The fluid passageway includes opposed upstream and downstream ends. The fluid passageway is cylindrical from the upstream end substantially to the downstream end. The diameter of the cylindrical fluid passageway in the spherical valving member is substantially equal to the diameters defined by the cylindrical upstream and downstream fluid passages in the valve housing. The spherical valving member includes a spherically generated throttling wall which partly closes the fluid passageway through the valving member. The throttling wall has an outside radius equal to the radius of the spherical valving member and is generated about the center of the spherical valving member. Thus, the exterior of the throttling wall merges uniformly into the outer surface of the spherical valving member. The inner surface of the throttling wall also is spherically generated about the center of the spherical valving member, but defines a radius sufficiently less than the radius of the outer surface of the throttling wall to provide a throttling wall thickness suitable for resisting the forces generated by the flowing fluid.

The throttling wall is characterized by a generally oblong outlet aperture formed therethrough. The outlet aperture includes top and bottom edges which are parallel to one another and disposed symmetrically on opposite respective sides of the axis of the cylindrical passageway extending through portions of the spherical valving member upstream of the throttling wall. More particularly, the top and bottom edges of the outlet aperture through the throttling wall lie in parallel planes that are orthogonal to the axis of the valve stem. The outlet aperture further includes side edges extending between the respective top and bottom edges. Side edges may be disposed and configured to register with the inner circumference defined by the cylindrical downstream fluid passage through the valve housing. The width of the outlet aperture through the throttling wall may be equal to the diameter of the cylindrical fluid passages and is substantially greater than the height of the aperture through the throttling wall. More particularly, the height preferably is between about 0.15–0.40 the width of the outlet aperture, and most preferably between about 0.20 and 0.25 the width of the outlet aperture.

The combination of the cylindrical passageway through the spherical valving member with the spherically generated throttling wall and the generally oblong outlet aperture in the throttling wall has proved to be extremely effective. Over broad ranges of valve positions, the subject valve provides nearly linear relationships between valve positions and fluid flow rates.

DETAILED DESCRIPTION OF THE PREFERRED EMBODIMENT

Figure 1:
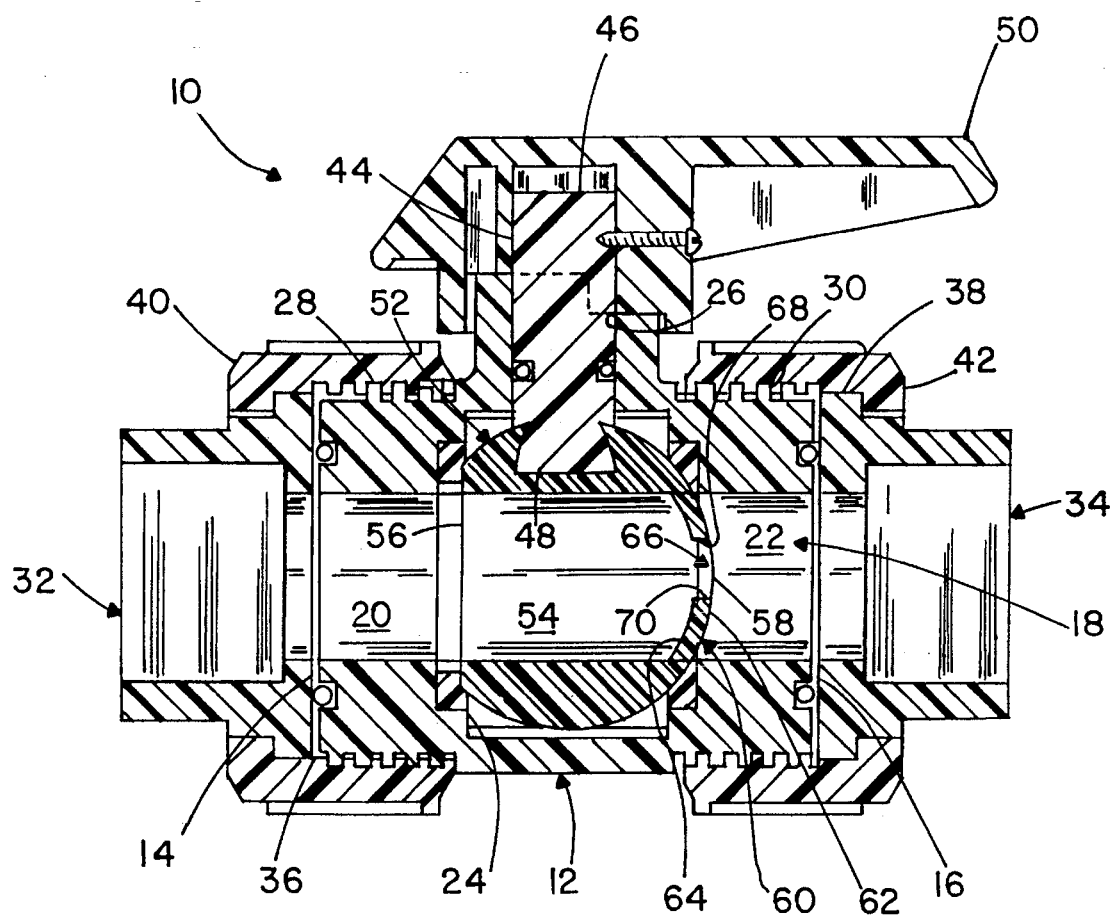
FIG. 1 is a longitudinal cross-sectional view of a valve in accordance with the subject invention with the valving member in the fully opened condition.
Figure 2:
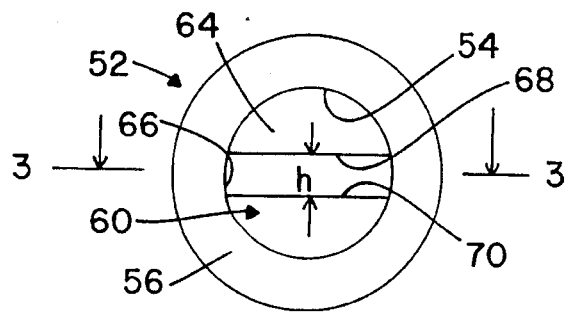
FIG. 2 is an end elevational view of the spherical valving member as viewed from the upstream end.
Figure 3:
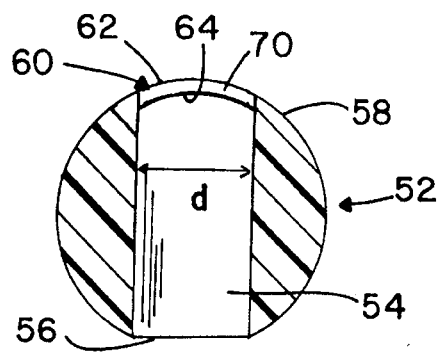
FIG. 3 is a cross-sectional view taken along line 3—3 in FIG. 2.
Figure 4:
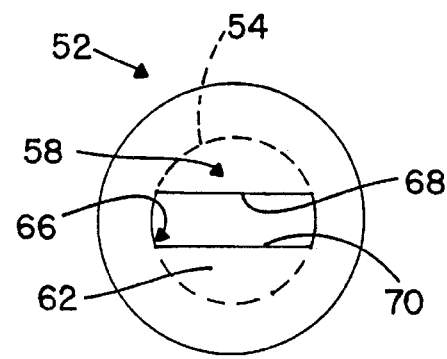
FIG. 4 is an end elevational view of the valving member as viewed from the downstream end.

A ball valve in accordance with the subject invention is identified generally by the numeral 10 in FIG. 1. The ball valve 10 includes a valve housing 12 unitarily molded from a thermoplastic material. The valve housing 12 includes an upstream end 14, a downstream end 16 and a flow passage identified generally by the numeral 18 extended entirely therethrough. The flow passage 18 is characterized by an cylindrical upstream passage 20 having a diameter "d". The flow passage further includes a cylindrical downstream passage 22 having a diameter "d" and being axially aligned with the upstream passage 20. A valve seat 24 is disposed between the upstream and downstream passages 20 and 22 for receiving a valving member as explained further herein. A stem aperture 26 extends through the valve housing 12 and into the region of the valve seat 24. The stem aperture 26 is aligned substantially orthogonally to the axes defined by the upstream and downstream fluid passages 20 and 22 in the valve housing 12. As explained further below, the stem aperture 26 will rotatably receive a valve stem for actuating a valving member in the valve seat.

The valve housing 12 includes upstream and downstream arrays of external threads 28 and 30 respectively. Thermoplastic nipples 32 and 34 with end flanges 36 and 38 respectively are seated against the respective upstream and downstream ends 14 and 16 of the valve housing 12. Coupling nuts 40 and 42 respectively are threadedly engaged with the upstream and downstream external threads 28 and 30 of the valve housing 12 to tightly seat the flanges 36 and 38 of the upstream and downstream nipples 32 and 34 against the respective upstream and downstream ends of valve housing 12. The upstream and downstream nipples 32 and 34 may then be butt-fused to other thermoplastic pipes in a system.

A valve stem 44 is rotatably disposed in the stem aperture 26. The valve stem 44 includes an external end 46 disposed outside the valve housing 12, and an internal end 48 disposed in the valve seat 24. An actuating handle 50 is mounted to the external end 46 of the valve stem 44 to facilitate rotational movement of the valve stem 44. The valve stem 44 and the valve housing 12 are provided with interengageable stops for permitting only 90° of rotation of the valve stem 44.

A spherical valving member 52 is rotatably mounted in the valve seat 24 and is fixedly connected to the valve stem 44. Thus, rotation of the valve stem 44 will generate an equivalent amount of rotation of the spherical valving member 52. The valving member 52 includes a fluid passageway 54 extending therethrough. The fluid passageway 54 includes an upstream end 56 and a downstream end 58. More particularly the fluid passageway defines a cylinder of diameter "d" extending from the upstream end 56 toward the downstream end 58. Thus, the upstream end 56 of the fluid passageway 54 can be aligned with the cylindrical upstream passage 20 of the housing 12.

The passageway 54 through the valving member 52 does not continue cylindrically entirely to the downstream end 58. Rather, the valving member 52 includes a spherically generated throttling wall 60 partly enclosing the fluid passageway 54 through the valving member 52. The throttling wall 60 includes an outer surface 62 that is spherically generated about the same center as the spherical valving member 52 and with an identical radius. Thus, the outer surface 62 of the throttling wall 60 is a continuous extension of the spherical outer surface of the valving member 52. The throttling wall 60 further includes an inner surface 64 which also is spherically generated about the same center as the outer surface 62. However, the inner surface 64 is generated about a smaller radius which is selected to define a wall thickness suitable for withstanding forces generated by the fluid flowing through the valve 10.

An outlet opening 66 extends through the throttling wall 60. The outlet opening 66 is generally oblong and includes top and bottom edges which are parallel to one another at locations symmetrically disposed on opposite sides of the axis of the cylindrical portions of the fluid passageway 54 through the valving member. Additionally, the top and bottom edges 68 and 70 lie in planes that extend orthogonally to the axis of the valve stem 44.

The outlet opening 66 further includes side edges 72 and 74 which extend between the top and bottom edges 68 and 70 and which are spaced from one another a distance approximately equal to the diameter "d" of the fluid passageway 54 through the valving member 52. Thus the side edges 72 and 74 of the outlet opening 66 are contiguous with the cylindrical wall of the passageway 54 through the valving member. The distance between the top and bottom edges 68 and 70 defines a height "h" for the outlet opening 66 which will vary in accordance with the size of the valve. However, the height "h" of the outlet opening 66 is equal to approximately 0.20–0.25 of the diameter "d".

Figure 5:
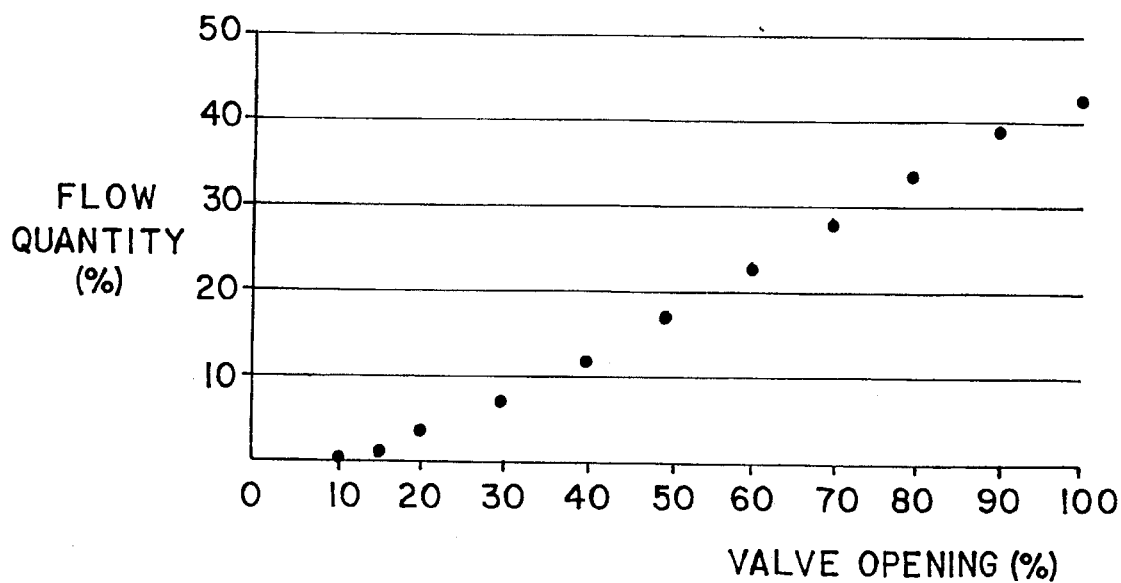
FIG. 5 is a graph comparing flow characteristics of the valve at different rotational orientations of the valving element.

FIG. 5 depicts the flow characteristics for the valve 10 shown in FIG. 1. More particularly, a valve 10 with passages having inside diameters of 3.75 inches was tested with flowing water. The outlet opening in the throttle wall of the spherical valving member defined a height of 0.875 inch. Percentages of maximum flow quality $C_v$ were calculated at different percentages of valve opening from 0 to 100%. The graph of FIG. 5 shows a very nearly linear relationship for all valve openings.

While the invention has been described with respect to a preferred embodiment, it is apparent that various changes can be made without departing from the scope of the invention as defined by the appended claims.

I claim:

1. A throttling valve comprising:

a valve housing having a cylindrical upstream passage, a substantially identical cylindrical downstream passage axially aligned with the upstream passage and a valve seat therebetween, a stem aperture extending through said housing and into said valve seat substantially orthogonally aligned to the upstream and downstream passages;

a valve stem rotatably mounted in the stem aperture and extending from a location outside said valve housing to a location within said valve seat; and a spherical valving member rigidly mounted to said valve stem and rotatably mounted in said valve seat, said spherical valving member having a fluid passageway extending therethrough, said fluid passageway having opposed upstream and downstream ends, portions of said fluid passageway extending from said upstream end to a location substantially adjacent said downstream end defining a cylinder axially alignable with the respective upstream and downstream passages in said housing, said downstream end of said fluid passageway being characterized by a throttling wall spherically generated about the center of the spherical valving member, said throttling wall having an oblong outlet opening formed therethrough.

2. The valve of claim 1, wherein the outlet opening defines a cross-sectional area less than the cross-sectional area defined by the cylindrical portion of the fluid passageway through said valving member.

3. The valve of claim 1, wherein the portion of the fluid passageway through the spherical valve member defines a central axis and wherein the outlet opening has a long axis extending transverse to the central axis of the cylindrical portions of the passageway through the valving member and transverse to the valve stem.

4. The valve of claim 3, wherein the outlet opening defines a height measured generally parallel to the valve stem and a width measured orthogonal to the height, the height defining a minor cross-sectional dimension of the outlet opening and being 0.15–0.40 times the width of the outlet opening.

5. The valve of claim 4, wherein the height of the outlet opening is 0.20–0.25 times the major cross-sectional dimension of the outlet opening.

6. The valve of claim 3, wherein the outlet aperture includes top and bottom edges extending generally parallel to one another and symmetrically disposed on opposite respective sides of the central axis of the fluid passageway through the valving member.

7. The valve of claim 6, wherein the top and bottom edges lie within planes extending orthogonally to the valve stem.

8. The valve of claim 7, wherein the outlet aperture includes side edges extending between the respective top and bottom edges, the side edges being disposed to align with surfaces of the cylindrical passageway through the valving member.

9. A throttling valve comprising:

a valve housing having a cylindrical upstream passage, a substantially identical cylindrical downstream passage axially aligned with the upstream passage and a valve seat therebetween, a stem aperture extending through said housing and into said valve seat substantially orthogonally aligned to the upstream and downstream passages;

a valve stem rotatably mounted in the stem aperture and extending from a location outside said valve housing to a location within said valve seat; and a spherical valving member rigidly mounted to said valve stem and rotatably mounted in said valve seat, said spherical valving member having a fluid passageway extending therethrough, said fluid passageway having opposed upstream and downstream ends, portions of said fluid passageway extending from said upstream end to a location substantially adjacent said downstream end defining a cylinder axially alignable with the respective upstream and downstream passages in said housing, said downstream end of said fluid passageway being characterized by a throttling wall tapering inwardly symmetrically relative to a plane passing diametrically through the spherical valving member and orthogonal to the valve stem, said throttling wall having an oblong outlet opening formed therethrough and disposed symmetrically relative to the plane.

* * * * *